United States Patent [19]

Knop et al.

[11] 4,417,784
[45] Nov. 29, 1983

[54] MULTIPLE IMAGE ENCODING USING SURFACE RELIEF STRUCTURES AS AUTHENTICATING DEVICE FOR SHEET-MATERIAL AUTHENTICATED ITEM

[75] Inventors: Karl H. Knop, Zurich; Michael T. Gale, Wettswil, both of Switzerland

[73] Assignee: RCA Corporation, New York, N.Y.

[21] Appl. No.: 236,111

[22] Filed: Feb. 19, 1981

[51] Int. Cl.³ .......................... G02B 5/18; G09F 3/03
[52] U.S. Cl. .................................. 350/162.19; 283/91; 428/916
[58] Field of Search .............................. 283/91, 902; 350/162.11, 162.17, 162.19, 162.23; 427/7; 428/915, 916

[56] References Cited

U.S. PATENT DOCUMENTS 4,124,947  11/1978  Kuhl et al. ........................ 283/902
4,186,943   2/1980  Lee ...................................... 283/91

FOREIGN PATENT DOCUMENTS 1394021  5/1975  United Kingdom .

Primary Examiner—Bruce Y. Arnold
Assistant Examiner—William Propp
Attorney, Agent, or Firm—J. S. Tripoli; G. J. Seligsohn

[57] ABSTRACT

An authenticating device comprises a transparent material, such as a plastic, having a thickness no greater than 100 micrometers embossed on one side with a lenticular array of lenslets having focal lengths substantially equal to this thickness, and embossed on the other side with a reflective relief pattern forming a periodic structure periods smaller than 100 micrometers, which periods are of a width that at least approximates that of the lenslets. The reflective relief structure of the authenticating device is secured to a viewable surface of the authenticated item sheet material and each period of the relief structure is comprised of a set of juxtaposed elements having significantly different reflective characteristics from one another.

14 Claims, 6 Drawing Figures

Fig./
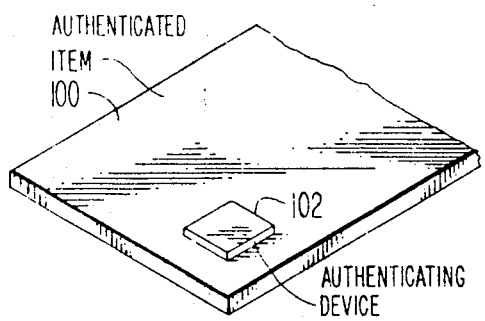
Fig.la
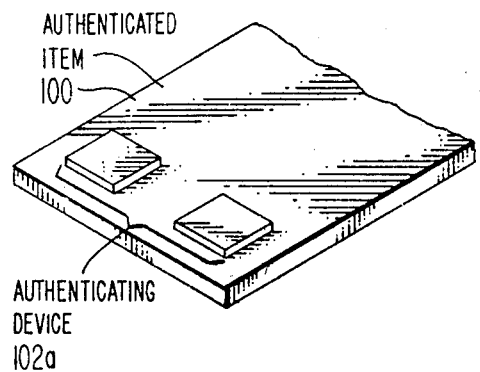
PRIOR ART
Fig. 2
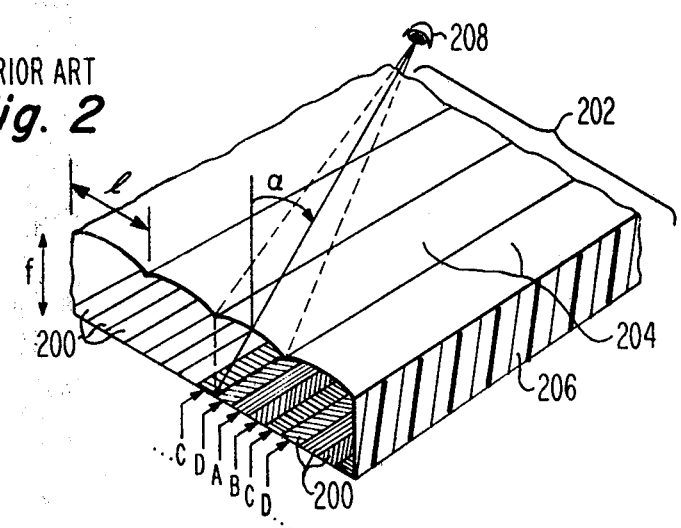

MULTIPLE IMAGE ENCODING USING SURFACE RELIEF STRUCTURES AS AUTHENTICATING DEVICE FOR SHEET-MATERIAL AUTHENTICATED ITEM

This invention relates to devices for authenticating various items of sheet materials which are subject to counterfeiting, such as bank notes and other valuable documents, credit cards, passports, security passes, and phonograph records or their covers, for example. The present invention is related to the respective invention disclosed in U.S. patent application Ser. No. 235,970 by Webster, et al, filed on even date herewith and assigned to the same assignee as the present application.

Recently, there have been great advances in color copying of documents. It is believed that these advances will continue. Therefore, in the near future, it is likely that it will be possible to make a color photocopy of a bank note that the man-in-the-street is incapable of (or, at least, will have great difficulty in) distinguishing from the original. More particularly, while it is true that a genuine bank note makes use of authenticating means (such as inks of many colors and intricate engraved designs on special paper which sometimes contain watermarks or embedded colored platelets or metal threads) which currently permit an expert to distinguish a counterfeit from a genuine bank note, the unsophisticated layman is in no position to make use of such authenticating means. Therefore, as color copying improves, a real danger exists that the man-in-the-street will lose faith in the genuineness of paper currency. Such a situation would create havoc.

In order to be practical, any authenticating device for solving this problem must, inter alia, meet all four of the following criteria:

1. The authenticating device must produce an effect which is not capable of being reproduced by any type of color copier.

2. The effect produced by the authenticating device must be quickly and readily discernable, under ordinary lighting conditions, without requiring any significant degree of skill on the part of an unsophisticated layman.

3. The sophistication and capital cost of the equipment required to fabricate an authenticating device and to securely attach the authenticating device to an authenticated item (e.g., bank note, etc.) must be high enough to be beyond the reach of would-be counterfeiters.

4. Under high volume conditions, the additional per-unit cost of fabricating an authenticating device and securely attaching it to the authenticated item (including both the amortization of the high capital cost of the equipment, as well as the per-unit variable cost) must be low enough not to constitute an impediment to its use.

The present invention is directed to authenticating device which meets all of the above set forth for criteria. More specifically, the present invention is similar to that disclosed in aforesaid U.S. patent application Ser. No. 235,970 to the extent that both cases a substrate is bonded to sheet material of which an authenticating item subject to counterfeiting is comprised. This substrate has a reflective periodic structure formed as a relief pattern on a viewable surface thereof. Further, in both cases, a transparent material fills and covers the structure, the transparent material exhibiting a given index-of-refraction and being bonded to the viewable surface of the substrate in a manner sufficiently secure to prevent the transparent material from being removed from the structure without effectively destroying the structure.

In U.S. patent application Ser. No. 235,970, the reflective periodic structure formed as a relief pattern on a viewable surface of the substrate of the authenticated device is limited to a reflective diffraction grating structure. In the present invention, on the other hand, the periodic structure may take any form in which the period thereof is smaller than 100 micrometers and each period is comprised of substantially the same given set of a plural number of juxtaposed elements, respective elements of the given set having significantly different characteristics from one another. Further, in the present invention, a transparent material has a given thickness of no greater than 100 micrometers and has a periodic lenticular array embossed on that surface thereof which is situated distal to the periodic structure. Each period of the array is comprised of a lens having an aperture width that at least approximates that of a period of the structure and has a focal length substantially equal to the given thickness of the transparent material.

In the drawings:

FIG. 1 is a schematic diagram of a first embodiment of authenticated item having an authenticated device, comprised of a single integrated structure, bonded thereto;

FIG. 1a is a schematic diagram of a second embodiment of an authenticated item having an authenticating device, comprised of a plurality of spaced integrated structures bonded thereto;

FIG. 2 is a schematic diagram of a prior art structure which is similar in certain respects to that of an integrated structure of the authenticating device in the present invention;

Figure 3:
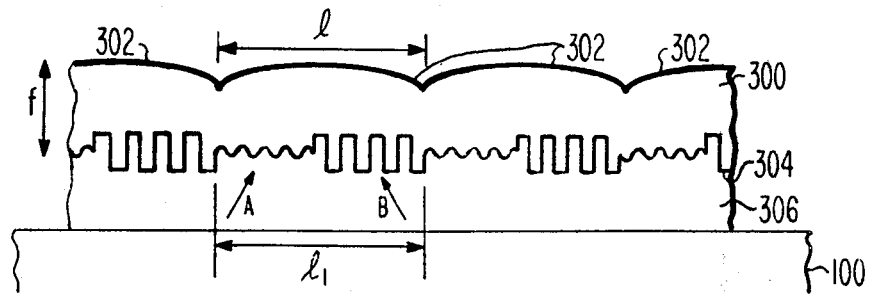
FIG. 3 is a schematic diagram of a first embodiment of an integrated structure of the present invention.

Referring to FIG. 1, there is shown authenticated item 100 comprised of a sheet material, such as plastic or paper. In describing the present invention, for illustrative purposes, it may be assumed that authenticated item 100 is a bank note. However, it should be understood that authenticated item 100 may take other forms, such as other types of valuable documents having intrinsic value, credit cards passports, security passes, or phonograph records or covers therefor, by way of examples. In any case, authenticated item 100 has bonded thereto authenticating device 102. Authenticating device 102 consists of a single integrated structure. In FIG. 1a, authenticating device 102a consists of a plurality of two (or more) spaced integrated structures.

Referring to FIG. 2, there is shown a prior art technique for storing multiple images in a single plane 200. A lenticular array 202 consisting of multiple cylindrical lenses 204 is placed at the focal distance f in front of plane 200 containing the image information A, B, C and D. Usually, the lenslets 204 are formed as a relief structure on one side of a plastic sheet 206, and the image information A, B, C and D is printed on the other side by conventional printing techniques. When viewing at a well defined angular direction α with respect to the normal, only a very narrow stripe in the image plane can be seen (i.e., only light from this narrow stripe is reaching the eye 208 of an observer). By dividing the area under each lenslet 204 into a corresponding set of stripes A, B, C and D, in which the A stripes of corresponding sets contain a first picture, the B stripes of corresponding sets contain a second picture, etc., each individual picture is separately read out by viewing at a different appropriate angle.

The main use of the technique shown in FIG. 2 is for producing serial graphic reproductions in the form of three-dimensional postcards. In this case, cylindrical lenslets 204 are oriented on a vertical axis such that the left eye and the right eye see different pictures and thus, produce an illusion of depth. Typically, lenslets 204, in this application, have a width l of about 0.3–0.4 mm and a focal distance f of similar size.

An earlier application of lenticular arrays for image multiplexing was for the old Kodacolor process. In this case, the three pictures which contain the red, green and blue content of the color picture were recorded in three sets of stripes in a black-and-white photographic emulsion. Due to the high resolution capabilities of the photographic recording, it was possible to use fine lenslets with widths of about 0.05 mm. For recording and readout, three adjacent color filters positioned near the camera/projection lens were needed in the optical path.

In accordance with the principles of the present invention, image multiplexing by lenticular arrays is employed in an authenticating device for an authenticated item comprised of a sheet material. However, the prior art arrangement shown in FIG. 2 cannot be used for this purpose. This is because the thickness of sheet material (such as bank note paper) is typically around 0.1 mm, and the authenticating device should not add significantly to the thickness of this sheet material. Therefore, the thickness f (the focal length of lenslets 204 of lenticular array 202 and the respective widths l of lenslets 204 can never be as large in size as 0.1 mm. Preferably, f and l could be in range of 0.01–0.05 mm. Stripes of such dimensions are smaller than can be produced with today's best printing techniques. In addition, a serious problem in registration is encountered, since the stripes have to be aligned precisely with respect to the lenslets 204 of lenticular array 202 with tolerances of only a few micrometers. Thus, the prior art arrangements of printed stripes A, B, C and D, shown in FIG. 2, cannot be used in implementing the authenticating device of the present invention.

Referring to FIG. 3, there is shown a sheet of transparent material 300, such as plastic, having a given index-of-refraction. Sheet 300, like sheet 206 of the prior art arrangement shown in FIG. 2, has a lenticular array, composed of lenslets 302, embossed on the upper surface thereof. The thickness f of sheet 300 and the width l of lenslets 302 are each smaller in size than 100 micrometers, preferably being in the range of between 10 and 50 micrometers. The stripes printed on the plane surface 200 of the prior art arrangement of FIG. 2 are replaced in the present invention, with a reflective periodic structure formed as a relief pattern on a viewable surface of transparent material, in which the period of this periodic structure is smaller in size than 100 micrometers and each period is comprised of substantially the same given set of a plural number of juxtaposed elements, respective elements of the given set having significantly different reflective characteristics from one another. The relief pattern is oriented substantially parallel to the lenticular array. More particularly, in the first embodiment of the present invention, shown in FIG. 3, the relief pattern 304 comprises periodically arranged sets of different diffraction grating structures. Each period of relief structure 304 is l widths, which, alternatively, may be identical to slightly different from the size of l. The different diffractive structures forming the juxtaposed elements of the set associated with each period may constitute reflective sinusoidal grating structures (such as grating structure A of FIG. 3), reflective rectangular-wave grating structures (such as grating structure B of FIG. 3), or a reflective grating structure of any other desired grating profile, or a mixture of different grating profiles. In any event, the grating profile, line spacing and/or amplitude of the different reflective grating structures forming the same given set for respective ones of the periods of relief patterns 304 are selected so that they reflect incident polychromatic light with appreciably different chrominance and/or luminance effects. In this regard, reference is made to the teachings of U.S. Pat. No. 3,957,354, which issued to Knop on May 18, 1976. Also of interest are the teachings of U.S. Pat. No. 4,062,628 which issued to Gale on Dec. 13, 1977 and U.S. Pat. No. 4,130,347 which issued to Knop on Dec. 19, 1978.

Relief pattern 304, as well as lenticular lenses 302, can be easily and inexpensively fabricated by simultaneously embossing sheet 300 on both sides with appropriate platens in a suitable press. Thereafter, relief structure 304 may be made reflective by vacuum deposition (evaporation or sputtering) of a reflective metal coating. After fabrication, sheet 300 may be attached as an integrated structure of the authenticating device to authenticated item 100 by a layer of adhesive 306, which bonds the undersurface of relief pattern 304 to a surface of authenticated item 100.

Corresponding elements (such as element A in FIG. 3) of respective periods of relief pattern 304 may be substantially identical in all respects so that as the eye angularly moves, stripes of different color and/or contrast are seen. Alternatively, corresponding elements (such as element A in FIG. 3) of respective periods of relief pattern 304 may be spatially modulated (e.g., such as amplitude) in accordance with picture information on a large scale. Further, if the width of $l_1$ of a period of relief pattern 304 is substantially equal to the width l of a lenticular lens 302, there will be a switching effect as the eye is angularly moved between the multiple images defined by respective specified ones of juxtaposed elements (such as elements A or elements B). Alternatively, by making the size $l_1$ of a period of relief pattern 304 slightly different from (i.e., only approximately equal to) that of the width l of a lenticular lens 302, the respective position of the multiple images appears to move continuously as the viewing angle changes.

The sinusoidal and rectangular-wave profile diffraction grating structures are specifically shown in FIG. 3 because they have well-defined reflection characteristics that make them suitable for use in the present invention. However, as discussed above, grating structures having other profiles, (such as triangular, sawtooth and/or lenticular, etc.) can also be employed. Further, in order to enhance differences in reflectivity, the grating structures may be oriented at an angle different from zero (with respect to lenslets 302).

Figure 4:
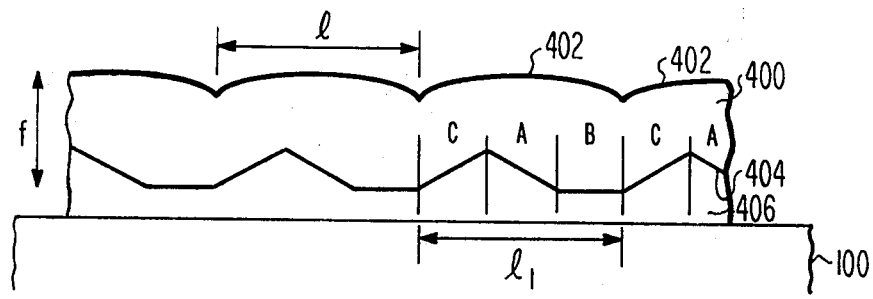
FIG. 4 is a schematic diagram of a second embodiment of an integrated structure of the present invention.

Further, the juxtaposed elements of the reflective periodic relief pattern structure need not be composed of diffraction grating structures, as shown in FIG. 3. Instead, as shown in FIG. 4, the juxtaposed elements of each period of the reflective periodic structure formed by relief pattern 404 may be comprised of plane mirror reflectors (e.g., juxtaposed elements A, B and C), each having a different slope from one another with respect to the plane of the lenticular array formed by lenslets 402. Differences in the reflection characteristics of elements A, B and C of pattern 404, with respect to one another, can be enhanced further by coating the separate elements A, B and C differently. For instance, evaporating various materials at different angles produces respective mirrors for juxtaposed elements A, B and C which exhibit inherently different reflectivities. Respective items 400, 402 and 406 of the embodiment of the present invention shown in FIG. 4 are identical in structure and function to the corresponding items 300, 302 and 306 of the first embodiment of the present invention shown in FIG. 3.

Figure 5:
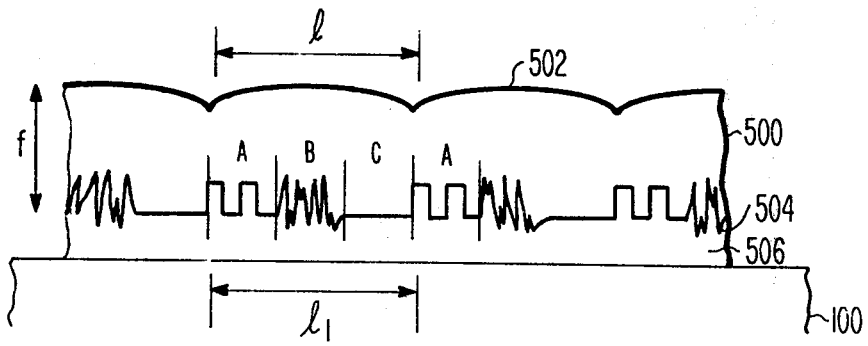
FIG. 5 is a schematic diagram of a third embodiment of an integrated structure of the present invention.

A third embodiment of the present invention is shown in FIG. 5. In this embodiment, juxtaposed elements A, B and C of each period of a reflective periodic structure formed by relief pattern 504, exhibit different textures from one another. More specifically, elements A and C of relief pattern 504 represent two types of random relief patterns which are originally produced in a pressing master by different methods, (e.g., sandblasting, chemical etching or exposure of a photoresist with a diffuse light, for example) which result in distinguishable reflective textures. Element B of relief pattern 504 is a plane mirror, which inherently has a higher reflectivity and a different texture from either element A or element C. Thus, distinguishable multiple images are producible by relief patterns 504. Respective items 500, 502 and 506 of the third embodiment shown in FIG. 5 are identical in structure and function to the corresponding items 300, 302 and 306 of the first embodiment shown in FIG. 3.

The respective embodiments shown in FIGS. 3, 4 and 5 are intended to be examples of different techniques for obtaining the reflective periodic relief pattern structure of the present invention in which each period is comprised of substantially the same given set of a plural number of juxtaposed elements, respective elements of the given set having significantly different reflective characteristics from one another.

The present invention has been experimentally verified. A lenticular array with a period of 15 micrometers and a focal length of 40 micrometers was embossed on one side of the sheet of polyvinylchloride (PVC) having a thickness of 40 micrometers. A relief pattern structure, which conformed to the second embodiment of the present invention shown in FIG. 4, consisted of three plane segments of about equal length and with the slope of 0°, −55° and +55° (V groove and plane surface). Both the lenticular array and the relief structure were hot embossed into the 40 micrometer thick VC sheet. Then the relief pattern structure was coated with a thin layer of gold and subsequently with a thicker layer of aluminum by evaporation techniques. Finally, the plastic sheet was glued onto paper.

The performance of the experimental device was satisfactory. When viewing at an angle that selects the flat portion of the relief pattern structure, the appearance is light (metallic), at all other angles little light is reflected back to the observer. The contrast under typical diffuse light illumination is estimated to be better than a factor of two for this experimental device. This proves that a V-groove can be used as a dark forming element for building up picture information.

In the experimental device, the narrowest dimension of the size of the respective light-formed images and of the dual-formed images was sufficient to subtend an angle substantially larger than two milliradians at a viewing distance of 30 centimeters. This size was more than sufficient to permit an unsophisticated layman to quickly and readily discern the respective images under ordinary lighting conditions (i.e., comply with criterion 2 above). Furthermore, the widths of the respective lenslets and relief pattern periods were slightly different from each other, so that the multiple images appeared to move when viewed at different angles. This effect in the experimental device is not capable of being reproduced by any type of copier (i.e., comply with criterion 1 above).

What is claimed is:

1. In an article comprised of an authenticated item of sheet material which is subject to counterfeiting and an authenticating device bonded to said item, wherein said device includes a transparent material bonded to said sheet material, said material having a reflective periodic structure formed as a relief pattern on a viewable surface of said material which is proximate to said sheet material, said transparent material exhibiting a given index-of-refraction and being attached to said sheet material in a manner sufficiently secure to prevent said transparent material from being removed from said sheet material without effectively destroying said structure; the improvement in said device:

wherein the period of said periodic structure is smaller in size than 100 micrometers and each period is comprised of substantially the same given set of a plural number of juxtaposed elements, respective elements of said given set having significantly different reflective characteristics from one another, and wherein said transparent material has a given thickness no greater than 100 micrometers and has a periodic lenticular array embossed on a surface thereof which is distal to and is oriented substantially parallel to said periodic structure, each period of said array being comprised of a lens having an aperture width that at least approximates that of a period of said structure and having a focal length substantially equal to said given thickness.

2. The article defined in claim 1, wherein said juxtaposed elements of said given set are comprised of substantially parallel stripes, and wherein said lenticular array is comprised of cylindrical lenses having axes oriented substantially parallel to said parallel stripes.

3. The article defined in claim 1, wherein each period of said structure is between 10 and 50 micrometers, and wherein said given thickness is between 10 and 50 micrometers.

4. The article defined in claim 1, wherein said aperture width of each lens of said array is substantially equal to the width of a period of said structure.

5. The article defined in claim 1, wherein said aperture width of each lens of said array differs from but still approximate the width of a period of said structure.

6. The article defined in claim 5, wherein at least one given element of said set for each of said periods is comprised of a rectangular profile diffraction grating of a given optical amplitude which operates as a diffractive-subtractive filter for reflecting a zero diffraction order of a given color hue in response to illumination thereof with polychromatic light.

7. The article defined in claim 1, wherein said elements of said given set are comprised of separate diffractive-subtractive filters that exhibit zero diffraction order transfer functions in which adajacent filters are different from one another.

8. The article defined in claim 7, wherein at least one given element of said set for any one said periods is comprised of a sinusoidal profile of a given optical amplitude which operates as a diffractive-subtractive filter for reflecting a zero diffraction order of a given relative luminance in response to illumination thereof with polychromatic light.

9. The article defined in claim 8, wherein the value of said given optical amplitude is such as to substantially minimize the relative luminance of said reflected zero diffraction order.

10. The article defined in claim 8, wherein said given optical amplitude of said sinusoidal grating of said one given element is spatially modulated between successive periods of said structure in accordance with picture information.

11. The article defined in claim 1, wherein said elements of said given set are comprised of separate plane reflectors that have significantly different slopes from one another with respect to the plane of said viewable surface of said substrate.

12. The article defined in claim 11, wherein said elements of said given set exhibit respective reflectivities that are significantly different from one another.

13. The article defined in claim 1, wherein said elements of said given set are comprised have significantly different textures from one another.

14. The article defined in claim 1, wherein the reflective characteristics of the same respective elements of each of said given sets of successive periods of said structure, taken as a group, are spatially modulated in accordance with picture information.

* * * * *